United States Patent [19]

Aoki, deceased et al.

[11] Patent Number: 4,941,816
[45] Date of Patent: Jul. 17, 1990

[54] ROTARY TYPE INJECTION BLOW MOLDING MACHINE

[76] Inventors: Katashi Aoki, deceased, late of Sakaimachi; by Satoru Kimura, heir, 3-5-6, Saido, Urawa-shi, Saitama-ken, both of Japan

[21] Appl. No.: 315,790
[22] PCT Filed: Apr. 20, 1988
[86] PCT No.: PCT/JP88/00387
    § 371 Date: Dec. 19, 1988
    § 102(e) Date: Dec. 19, 1988
[87] PCT Pub. No.: WO88/08366
    PCT Pub. Date: Nov. 3, 1988

[30] Foreign Application Priority Data
    Apr. 20, 1987 [JP] Japan ................... 62-96686

[51] Int. Cl.⁵ .................. B29C 49/06; B29C 49/36
[52] U.S. Cl. ..................... 425/533; 264/538; 425/534; 425/540
[58] Field of Search .......... 425/533, 534, 540; 264/537, 538, 543

[56] References Cited
    U.S. PATENT DOCUMENTS 3,496,600  2/1970  Heston ............... 425/540 X
    3,764,250  10/1973 Waterloo ............ 425/540 X
    3,990,826  11/1976 Marcus .............. 425/525
    4,105,391  8/1978  Aoki ................ 425/540 X
    4,505,664  3/1985  Craig ............... 425/534 X
    4,579,518  4/1986  Farrell ............. 264/538 X
    4,648,824  3/1987  Aoki ................ 264/538 X
    4,726,756  2/1988  Aoki ................ 425/534 X
    4,731,011  3/1988  Aoki ................ 425/533 X
    4,747,769  5/1988  Nakamura et al. ..... 425/533 X FOREIGN PATENT DOCUMENTS
     70620  5/1982  Japan .
    159624 10/1982  Japan .
    244518 12/1985  Japan .

Primary Examiner—Richard L. Chiesa
Attorney, Agent, or Firm—Ostrolenk, Faber, Gerb & Soffen

[57] ABSTRACT

This invention relates to a rotary type blow molding machine which forms a working space between an intermittently rotatable transfer plate (14) above a machine bed having lip molds (15) at three locations on the lower surface thereof and the machine bed, the three locations on the machine bed of the working space forming three working stages, i.e., an injection molding stage, an orientation blow molding stage and a removing stage, wherein the injection molding stage is set sideward on the machine bed so that the orientation blow molding stage is positioned inwardly of the machine bed a clamping device (5) of the injection molding stage is positioned obliquely lengthwise of the machine bed (22) and stood upright, the injection mold (12) is installed parallel to the side edge of the machine bed and in the central portion of the clamping device (5), and an injection device (13) is arranged on the center line of the injection mold (12) crossed obliquely with respect to the tie bar axis at the clamping center of the clamping device (5).

3 Claims, 3 Drawing Sheets

ROTARY TYPE INJECTION BLOW MOLDING MACHINE

TECHNICAL FIELD

This invention relates to a rotary type injection molding machine which can continuously perform a series of operations from injection molding of a preform made of a synthetic resin to orientation blow molding of a packaging container such as a bottle.

BACKGROUND OF THE ART

A rotary type injection blow molding machine has four working stages consisting of an injection molding step, a temperature adjusting step, an orientation blowing step and a removing step as described in U.S. Pat. No. 4,105,391 Specification. These working stages are disposed at four locations of the machine bed, and a transfer plate provided at the under-side thereof with four lip molds corresponding to the working stages, respectively, is provided upwardly of the machine bed, so that when the transfer plate is rotated through 90°, an injection moled preform may be sequentially transported to the working stages, i.e., the temperature adjusting step and the orientation blowing step, and at the same time, a molded article such as a bottle which has orientation blow molded may be transported to the working stage, i.e. the removing step.

In such a molding machine as described above, the injection molding stage and the orientation blowing stage can be set opposedly each other on the machine bed in view of the order of steps, and the temperature adjusting stage can be set opposedly to the removing stage. Therefore, the arrangement of these working stages is extremely convenient in mounting devices necessary for molding on the rectangular machine bed, and the molding machine can be constructed compactly. Because the length of the machine bed can be utilized to place an injection apparatus thereon and a space for opening and closing a blow mold can be sufficiently secured. All the devices are well acccommodated on the machine bed.

The present inventor has previously accomplished the invention of the rotary type molding machine of the three-working stage with a temperature adjusting stage omitted (see U.S. Pat. No. 4,648,824). This three-working stage molding machine has the advantage in that when a preform is injection molded, an injection mold is utilized to effect the temperature adjustment of the preform, whereby the temperature adjusting device, devices incidental thereto and one lip mold may be omitted. However, the working stages, i.e., the injection molding step, the orientation blow molding step and the removing step are positioned at three locations of the machine bed, and therefore, if the injection molding stage is set in the central portion of the machine bed, the orientation blow molding stage together with the removing stage are obliquely positioned on the machine bed, and the opening and closing the blow mold, the replacement of the molds and the like are liable to be restricted as compared with the case of the four-working stage.

If the molding machine is small and the number of molded article to be taken is small, the blow mold is also small and the mold opening space need not be large and in addition, the weight is not so heavy, thus posing no particular problem. However, if two rows of cavity molds are provided into a larger size in order to increase the number of articles to be taken, the mold opening and closing, the replacement thereof and the like cannot be done smoothly merely by the restricted space on the machine bed, resulting in that an extension is to be provided on the side of the machine bed for these works.

Even if this extended portion is minor in view of the entire molding machine, it has to be removed for packing during transportation, and the installation space for the molding machine increases to constitute a trouble during the molding work, which is not desirable in use. If such a problem as noted above can be solved, even the molding machine of the three-working stage type can be used as a compact volume-production machine.

As the result of repeated researches, the present inventor has found that even in the three stage working stages, only the space on the machine bed can be utilized to smoothly carry out the molding opening and closing and also the replacement of molds.

DISCLOSURE OF THE INVENTION

It is an object of this invention to provide a rotary type injection blow molding machine which can utilize three locations on the machine bed as the working stages, and which can smoothly carry out the mold opening and closing, the replacement of molds and the like making use of the space on the machine bed without being affected by size of a blow mold even if an extension is not provided on the side of the machine bed.

It is a further object of this invention to provide a rotary type injection blow molding machine in which molds are arranged in two rows so that a number of molded articles may be molded, and even in such a case, the gate balance in the injection molding stage can be well maintained.

For achieving the aforesaid objects, this invention provides a rotary type blow molding machine in which a transfer plate provided at the underside with lip molds at three locations is intermittently rotatably provided above the machine bed to form a working space between said trnsfer plate and the machine bed, the three locations on the machine bed being used as three working stages, i.e., an injection molding stage, an orientation blow molding stage and a removing stage, said injection molding stage having a vertical type clamping device and an injection mold disposed thereon, said orientation blow molding stage having a blow mold and various device required for the orientation blow molding and said removing stage having a release device for releasing molded articles, and an injection device is disposed lengthwise of the machine bed with respect to said injection mold, characterized in that said injection molding stage is set sideward on the machine bed, said orientation blow molding stage is positioned inwardly of the machine bed, the clamping device in said injection molding stage is obliquely positioned lengthwise of the machine bed and stood upright, said injection mold is provided parallel to the side edge of the machine bed and in the central portion of said clamping device, and said injection device is arranged on a center line of the injection mold obliquely crossed with respect to an axis of a tie bar in the clamping center of the clamping device.

In such a molding machine, all molds can be arranged in an internal and external two-row fashion to orientation blow mold a number of molded articles at a time. Further, even if the injection molds are arranged in two rows, the nozzle touch of the injection device is effected in the central portion of both cavity molds, and therefore the length of the hot runner with respect to both the cavity molds becomes equal, and the gate balance in both the cavity molds is well maintained.

Moreover, since the orientation blow molding stage is set internally of the machine bed, and therefore the upper surface of the machine bed can be utilized for the replacing work of blow molds. In addition, even if the blow molds are arranged in two rows to increase the size of apparatus, the whole apparatus can be made compactly without providing an extension on the side of the machine bed.

BRIEF DESCRIPTION OF THE DRAWINGS

The drawings show one embodiment of a rotary type injection molding machine according to this invention; in which.

BEST MODE FOR CARRYING OUT THE INVENTION

Figure 1:
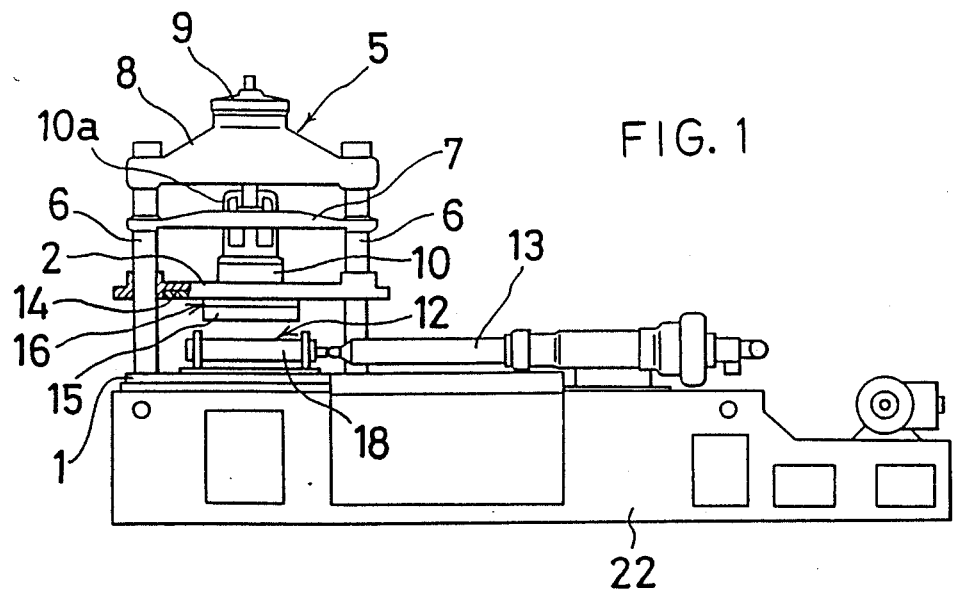
FIG. 1 is a side view of a molding machine part of which is cutaway.
Figure 2:
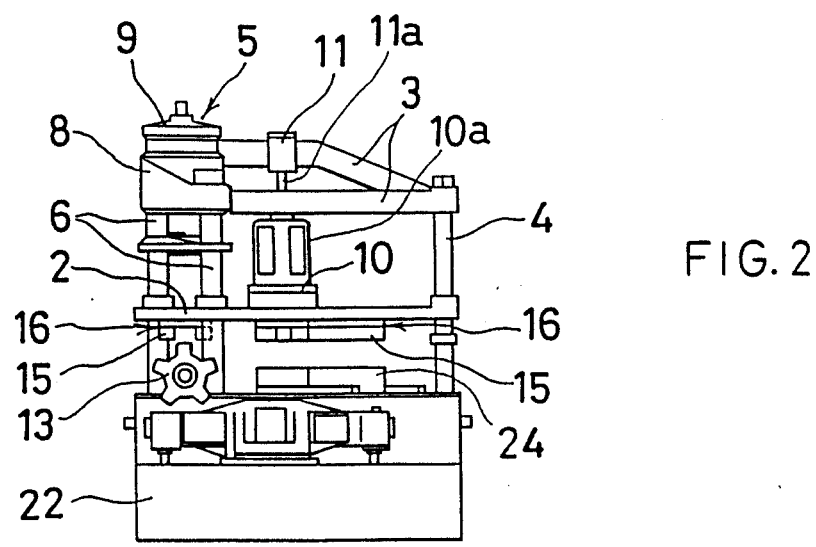
FIG. 2 is a back view of the molding machine.

In the Figures, reference numeral 1 designates a base plate secured to the upper surface of a machine bed 22. Reference numeral 2 designates a support plate disposed above the base plate, and two support columns 4, 4 stood upright on the base plate and a pair of tie bars 6, 6 of a vertical type clamping device 5 are inserted therethrough movably up and down. Upper ends of the support columns 4, 4 are integrally connected by means of a fixed frame 3 coupled to a clamping fixed plate 8.

Reference numeral 7 designates a clamping movable plate mounted movably up and down on the tie bars 6, 6, and reference numeral 9 designates a clamping cylinder which is positioned in the central portion of the clamping fixed plate 8.

Reference numeral 10 designates an intermittently rotating device which is installed in the central portion of the upper surface of the support plate 2. A rod 11a of a cylinder 11 which moves up and down provided in the central portion of the fixed frame 3 is connected to a cover member 10a made of steel in the periphery of the intermittently rotating device 10, whereby the support plate 2 and the intermittently moving device 10 may be moved up and down together.

Reference numeral 12 designates an injection mold secured onto the base plate 1, and reference numeral 13 designates an injection device.

On the underside of the support plate 2 is provided a circular transfer plate 14 connected to a rotating shaft of the intermittently rotating device 10 as partly shown in FIG. 1, and at three locations on the lower side of the transfer plate 14 which rotates through 120° leftward, three lip molds 15 are provided parallel to the tangential line of the transfer plate. The lip molds 15 are mounted on a base plate 16 in internal and external two rows and opened and closed in a radial direction of the transfer plate 11.

A working space is formed between the base plate 1 of the machine bed 22 and the transfer plate 14. Three locations on the machine bed where the working space is present are set as the working stages for an injection molding step, an orientation blow molding step and a removing step leftwise, and a mold opening and closing device, an orientation blowing device and a releasing device, not shown, are disposed on the base plate and the support plate corresponding to these working stages, respectively.

Figure 3:
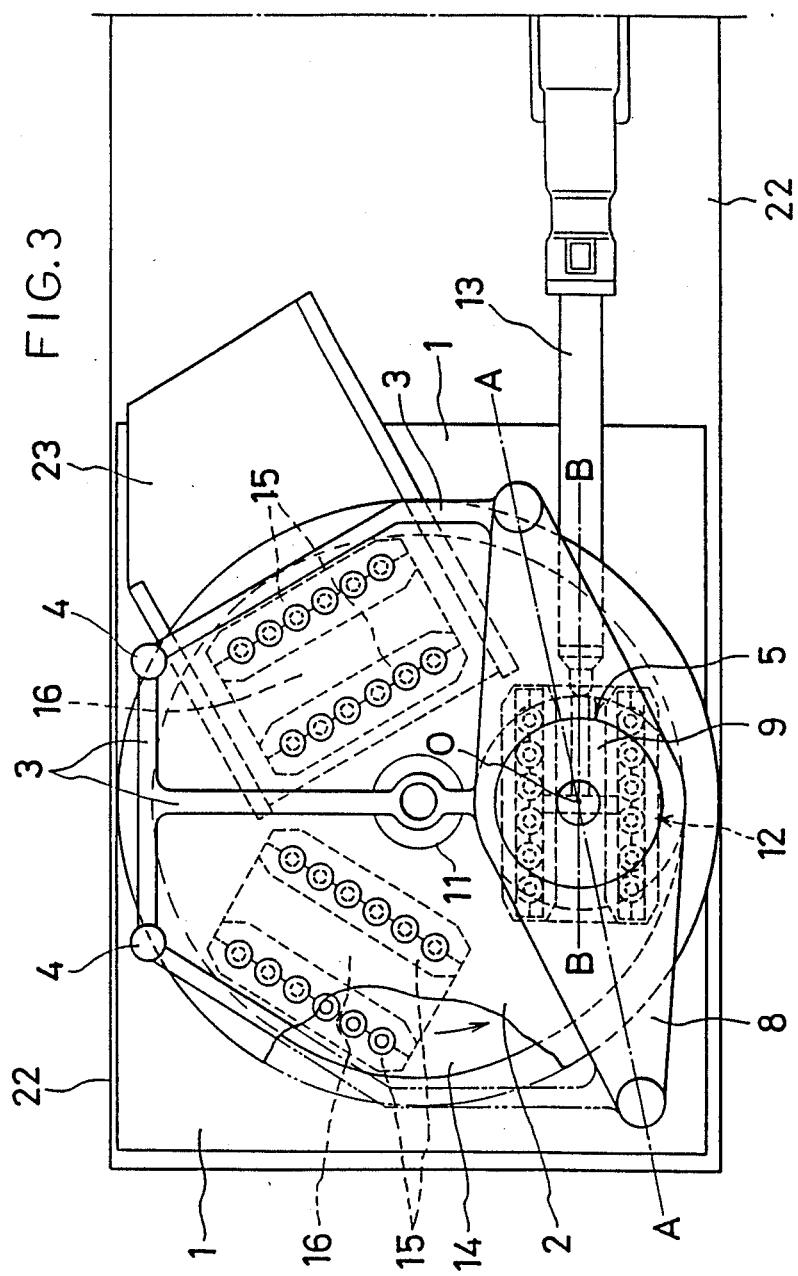
FIG. 3 is a schematic plan view of the molding machine.
Figure 4:
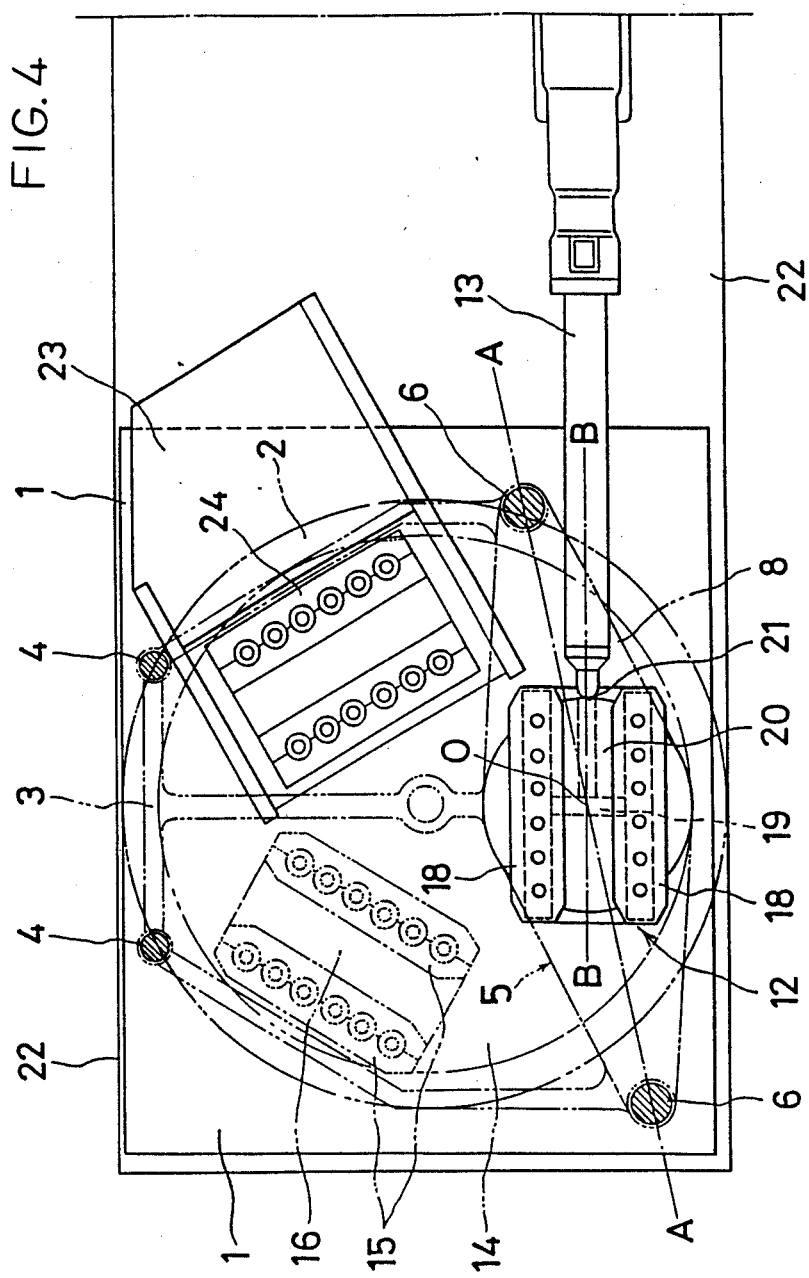
FIG. 4 is a schematic plan view showing the upper portion of the machine bed.

The injection molding stage in prior molding machine having the three working stages is set in the central portion on the machine bed. However, in this invention, the injection molding stage is set sideward on the machine bed as shown in FIGS. 3 and 4. By such a setting, the orientation blow molding stage is set inwardly of the machine bed so that a space as required is secured on the machine bed. This space can be sufficiently used for the work of replacing a blow mold 24, and a guide plate 23 is provided on the machine bed from the base plate 1 to pull out the blow mold 24 arranged immediately below the stop position of the lip mold onto the machine bed from the working space.

By setting the injection molding stage on the side, there occurs a limitation in installation of the clamping device, and the injection device 13 cannot be provided at right angles with respect to the axis connecting the centers of the tie bars 6, 6 as previously experienced. So, the clamping device 5 is directed toward the side of the machine bed, whereas the tie bar position on one side is deviated inwardly of the machine bed by a dimension as required to locate the clamping device 5 obliquely lengthwise. The tie bar axis A—A is positioned on the machine bed, in other words, it is positioned obliquely of the base plate 1, and there forms a required space between the tie bars 6 and 6 as viewed from the side of the clamping device 5 as shown in FIG. 1.

Such a space causes the injection device 13 to be able to be inserted, and even if the clamping device 5 is directed toward the side of the machine bed, the injection device 13 can be brought into nozzle touch with the injection mold 12 irrespective of the direction thereof.

The injection mold 12 is installed parallel to the side edge of the machine bed and in the central portion of the clamping device 5, and the injection device 13 is installed closer to the machine bed so that it may be positioned on the mold center line B—B crossed obliquely to the tie bar axis A—A at the clamping center 0 of the clamping device 5.

When the injection molds comprise two rows of parallel cavity molds 18 which close with the lip molds 15, a hot runner 19 supplying molten resins to both the cavities is branched into two parts from the central portion of a lower hot runner block 20, and a gate 21 is set on the mold axis B—B. Thereby, even if the cavity molds are in the two rows, the gate balance is maintained.

With the above-described arrangement, by setting the injection molding stage on the side of the machine bed, the orientation blow molding stage is inevitably set inwardly of the machine bed, and even if the mold becomes larger, an extension need not be provided on the side of the machine bed.

Further, the extreme-end position of the injection device assumes the front side as compared with the case where it is disposed at the right angle to the injection mold as in prior art, and the position of the blow mold becomes closer to the central portion of the machine bed, and therefore, the length and width of the machine bed is shortened to form the molding machine into compactness as a whole.

Moreover, since the clamping device is positioned obliquely with respect to the injection device, the injection device can be turned freely outside the machine bed, whereby the material replacing work, cleaning work of an injection tube, and the like may be easily carried out as additional merits.

INDUSTRIAL AVAILABILITY

As described above, according to the present invention, the restriction of the mold opening and closing space of the blow mold in the rotary type injection molding machine having three working stages is provided, and the setting position of the injection molding stage is made at the side of the machine bed, whereby the problem in arrangement of the clamping device and the injection device resulting therefrom is solved by a manner of setting the clamping device thereby making the merits of the three working stages more conspicuous and also realizing a larger type. Therefore, the molding machine according to the present invention can be extensively utilized as a volume production machine.

I claim:

1. In a rotary type blow molding machine in which a transfer plate provided at the underside with lip molds at three locations is intermittently rotatably provided above a machine bed to form a working space between said transfer plate and the machine bed, the three locations on the machine bed being used as three working stages, the three working stages being an injection molding stage, an orientation blow molding stage and a removing stage, said injection molding stage having a vertical type clamping device with tie bars and an injection mold disposed thereon, said orientation blow molding stage having a blow mold and devices required for the orientation blow molding and said removing stage having a release device for releasing molded articles, and an injection device is disposed lengthwise of the machine bed with respect to said injection mold, wherein the improvement comprising said injection molding stage is set sideward on the machine bed, said orientation blow molding stage is positioned inwardly of the machine bed, the clamping device in said injection molding stage is obliquely positioned lengthwise of the machine bed and stands upright, said injection mold is provided parallel to the side edge of the machine bed and in the central portion of said clamping device, and said injection device is arranged on a center line of the injection mold obliquely crossed with respect to an axis of said tie bars in the clamping center of the clamping device.

2. The rotary type blow molding machine according to claim 1, wherein the machine bed has a base plate provided thereon, a support plate provided on the underside thereof with a circular transfer plate above the base plate has support columns and said tie bars of the clamping device inserted therethrough and movable up and down, said support plate being provided in the central portion of the upper surface thereof with an intermittently rotating device for the transfer plate covered with a cover member made of steel, a rod of a cylinder which moves up and down provided in the central portion of the cover member being connected, said support plate being moved up and down together with the intermittently rotating device.

3. The rotary type blow molding machine according to claim 1, wherein the injection mold has two rows of parallel cavity molds which close with the lip molds on a lower hot runner block, a hot runner for supplying molten resins to both the cavity molds is branched into two parts from the central portion of the lower hot runner block, and a gate is set on the mold axis.

* * * * *